United States Patent [19]

Muan et al.

[11] Patent Number: 5,086,029
[45] Date of Patent: Feb. 4, 1992

[54] VANADIUM SPINEL MATERIALS IN THE $V_2O_3$—MNO—$SIO_2$ SYSTEM

[75] Inventors: Arnulf Muan, Lacey Spring, Va.; Mitri S. Najjar, Wappingers Fall, N.Y.

[73] Assignee: Texaco Inc., White Plains, N.Y.

[21] Appl. No.: 615,761

[22] Filed: Nov. 19, 1990

[51] Int. Cl.⁵ .................. B01J 21/08; B01J 23/22; B01J 23/34
[52] U.S. Cl. ................... 502/241; 502/247; 502/524
[58] Field of Search ............ 502/241, 247, 524

[56] References Cited

U.S. PATENT DOCUMENTS

| | | | |
|---|---|---|---|
| 2,674,582 | 4/1954 | Darby | 502/247 |
| 3,262,962 | 7/1966 | McDaniel et al. | 502/241 |
| 3,736,267 | 5/1973 | Bart et al. | 502/524 |
| 4,734,355 | 4/1988 | Guttmann et al. | 502/524 |

*Primary Examiner*—Carl F. Dees
*Attorney, Agent, or Firm*—Robert A. Kulason; James J. O'Loughlin; Albert Brent

[57] ABSTRACT

The present invention pertains to novel vanadium spinel materials and a method for their preparation. Each vanadium spinel material has a trivalent vanadium cation and is crystallized from a liquid having a composition that falls within a specific polygon shaped area in a ternary composition diagram of $V_2O_3$—MnO—$SiO_2$ as shown in the drawing herein e.g., FIG. 1. The compositions may be used as a catalyst for oxidation reactions.

11 Claims, 1 Drawing Sheet

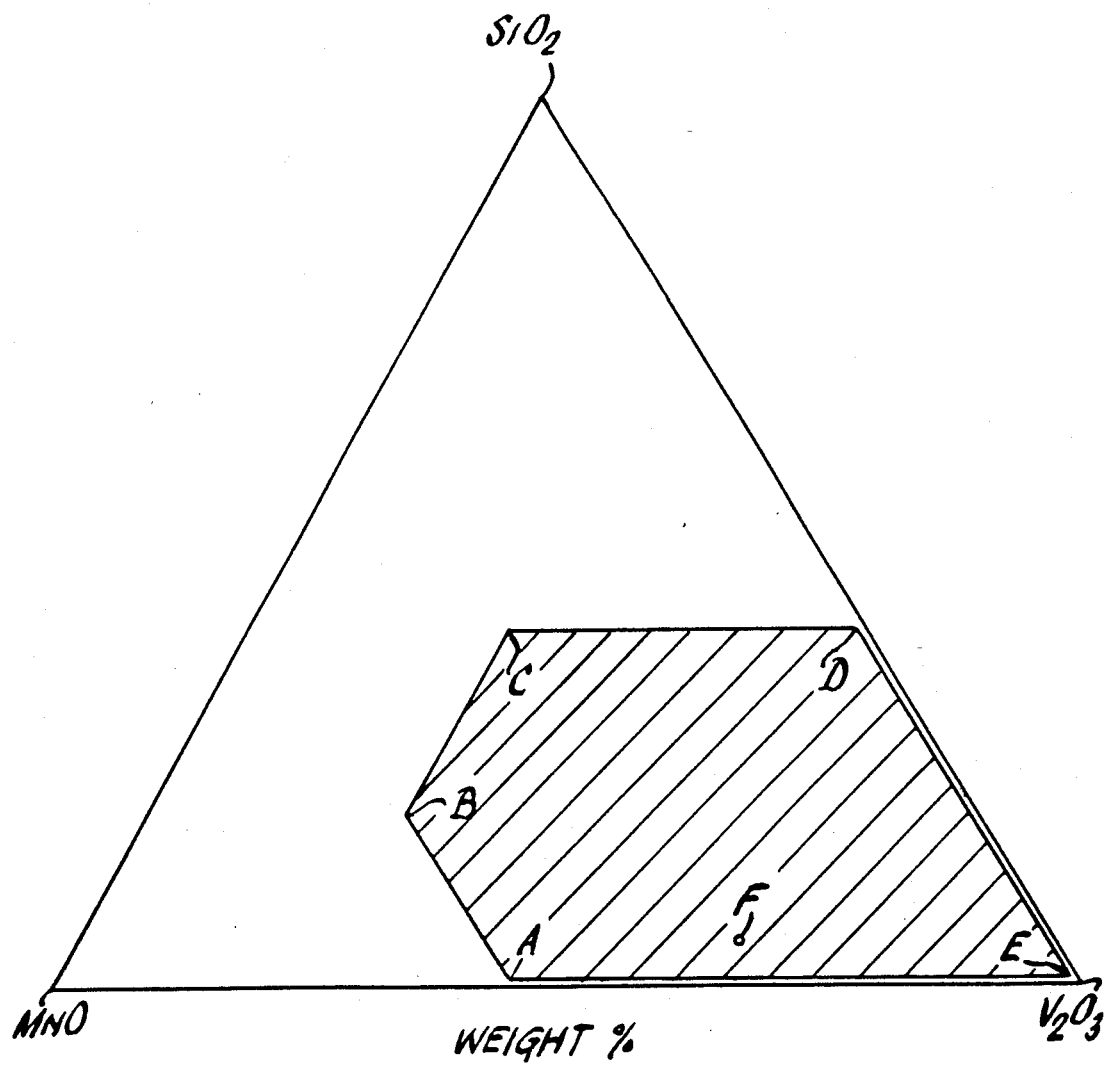

VANADIUM SPINEL MATERIALS IN THE $V_2O_3$—MNO—$SIO_2$ SYSTEM

BACKGROUND OF THE INVENTION

1. Field of the Invention

This invention relates to vanadium spinel materials in the $V_2O_3$—MnO—$SiO_2$ system.

2. Summary of the Invention

The present invention pertains to vanadium spinel materials and a method for their preparation. The material comprises vanadium spinels containing vanadium in the trivalent state. The drawing shows a polygon in a ternary composition diagram of $V_2O_3$, MnO and $SiO_2$. The material falling within said polygon represents compositions of liquids within the ternary system $V_2O_3$—MnO—$SiO_2$ with which said spinel phase is in equilibrium on the liquidus surface and from which the spinel phase is crystallized. The polygon shaped shaded area has the vertices and corresponding coordinates in weight percent as shown in Table I.

TABLE I

| Vertices | Coordinates (wt %) | | |
|---|---|---|---|
| | $V_2O_3$ | MnO | $SiO_2$ |
| A | 44 | 55 | 1 |
| B | 25 | 55 | 20 |
| C | 25 | 35 | 40 |
| D | 59 | 1 | 40 |
| E | 98 | 1 | 1 |

A method of preparing a vanadium spinel material that is crystallized from a liquid with which said vanadium spinel is in equilibrium on the liquidus surface, and wherein said liquid has a composition that falls within a polygon shaped area ABCDE as shown in the disclosed FIGURE for a ternary composition diagram of $V_2O_3$, MnO and $SiO_2$ comprises the steps of:

(1) heating $V_2O_5$ powder having a particle size of less than about 50 microns in an atmosphere in which the partial pressure of oxygen is in the range of $10^{-5}$ to $10^{-10}$ atmosphere and the $CO_2/H_2$ volume ratio is in the range of about 10/1 to 1/1 while gradually increasing the temperature stepwise over a temperature range of about 600° C. to 1300° C. and holding the final temperature for a period of at least about 24 hrs. to ensure complete reduction of all vanadium to $V^{3+}$;

(2) heating MnO powder having a particle size of less than about 50 microns for a period of about 10 to 14 hrs. at a temperature in the range of about 1200° C. to 1400° C.;

(3) heating $SiO_2$ powder having a particle size of less than about 50 microns for a period of about 10 to 14 hours at a temperature in the range of about 1000° C. to 1200° C.;

(4) thoroughly grinding together an amount of $V_2O_3$ from (1) in the range of about 25 to about 98 wt.%, with an amount of MnO from (2) in the range of more than 0 to about 55 wt.%, and with an amount of $SiO_2$ from (3) in the range of about more than 0 to about 40 wt.% to produce a mixture having a grain size of less than about 50 microns, (5) pelletizing the mixture from (4) at a pressure of about 5,000 psi;

(6) heating the pellets from (5) at a temperature in the range of about 1200° C. to 1600° C. for a period in the range of about 12 to 48 hrs. in an atmosphere in which the partial pressure of oxygen is in the range of $10^{-10}$ to $10^{-5}$ atmosphere to produce a melt; and (7) cooling the material from (6) and crystallizing out said vanadium spinel material, and separating said vanadium spinel material from the rest of the melt.

BRIEF DESCRIPTION OF THE DRAWING

The drawing depicts a ternary composition diagram of $V_2O_3$ MnO and $SiO_2$ showing a polygon shaped shaded area representing liquid compositions which are in equilibrium with vanadium spinel material on the liquidus surface and from which the vanadium spinel phase is crystallized.

DESCRIPTION OF THE INVENTION

Vanadium spinel materials have been synthesized by the subject invention in which spinel material involving trivalent vanadium cation as a component have been characterized. This work has led to synthesizing spinel phases in which trivalent vanadium cations are accommodated such as to render crystalline phases thermodynamically stable over a wide range of oxygen pressures at elevated temperatures.

The newly synthesized vanadium spinel materials have compositions that fall within a polygon shaped shaded area in the ternary composition diagram in the drawing, wherein the polygon shaped shaded area represents compositions of liquids with which said vanadium spinel is in equilibrium on the liquidus surface and from which said spinel phase is crystallized. The oxidation state of vanadium in the spinel material is mainly +3.

The polygon shaped shaded area has the following vertices and corresponding coordinates in weight percent:

| Vertices | Coordinates (wt %) | | |
|---|---|---|---|
| | $V_2O_3$ | MnO | $SiO_2$ |
| A | 44 | 55 | 1 |
| B | 25 | 55 | 20 |
| C | 25 | 35 | 40 |
| D | 59 | 1 | 40 |
| E | 98 | 1 | 1 |

A typical newly synthesized vanadium spinel material may be crystallized from a liquid with which said vanadium spinel is in equilibrium on the liquidus surface and wherein said liquid has the composition that is illustrated by point F in the drawing having the following coordinates in wt.%: $V_2O_3$ 65, MnO 30, and $SiO_2$ 5.

It is to be noted that the vanadium spinel appears as a primary phase on the liquidus surface of the system, $V_2O_3$—MnO—$SiO_2$. Accordingly, the growing of single crystals of this material is relatively simple, provided that atmospheric control of the type used in the synthesis procedure described herein is maintained during the crystal growing process. By the subject process, larger and better vanadium-containing spinel crystal are grown. The size of these crystals are in the range of about 1 to 50 Microns.

Spinels in the $V_2O_3$—MnO—$SiO_2$ system are synthesized in the following manner: First, $V_2O_3$ is prepared by heating commercially available analytical-grade $V_2O_5$ having a particle size of less than about 50 microns in a vertical tube furnace in an atmosphere of carefully selected oxygen pressure within the stability range of $V_2O_3$ e.g. in the range of $10^{-5}$ to $10^{-10}$ atmospheres.

This is accomplished by using a gas mixture of high-purity $CO_2$ and $H_2$ in controlled proportions. The $CO_2/H_2$ ratio by volume is in the range of 10/1 to 1/1. The relatively low melting point of the starting vanadium oxide ($V_2O_5$), e.g. about 690° C., necessitates heating the oxide slowly. Starting at a temperature of about 600° C., the temperature is gradually increased stepwise over a period of about 12 to 24 hrs. to a final temperature of about 1300° C. At that final temperature the vanadium oxide is held at least about 24 hrs. e.g. 24 to 30 hrs. to ensure complete reduction of all vanadium to $V^{3+}$ ($V_2O_3$).

Pre-heated analytical-grade iron and silicon oxides having a particle size of less than about 50 microns are used as starting materials for the other components of the spinel phase to be synthesized. For example, MnO powder is heated for a period of about 10 to 14 hrs. at a temperature in the range of about 1200° C. to 1400° C. prior to being used in preparation of the final mixtures, and $SiO_2$ powder is heated for a period of about 10 to 14 hours at a temperature in the range of about 1000° C. to about 1200° C.

The mixtures of the three oxide components are mechanically ground together under acetone in an agate mortar to ensure thorough mixing and a sufficiently small grain size e.g. less than 50 microns. For example, a specific amount of $V_2O_3$ in the range of about 25 to about 98 wt.% is ground together with a specific amount of MnO in the range of greater than 0, such as about 1 to about 55 wt.%, and a specific amount of $SiO_2$ in the range of greater than 0, such as about 1 to about 40 wt.% to produce a mixture having a grain size of less than about 50 microns. Complete formation of the desired compounds in the heat treatment step is thereby promoted. The oxide mixtures are pelletized at a pressure of about 5,000 psi or higher. The pellets may have any conventional size e.g. 1/16" to 1". The pellets are then heated at a temperature in the range of about 1200° C. to 1600° C. for a period in the range of about 12 to 48 hrs. in a vertical tube furnace with a carefully controlled partial pressure of oxygen in the range of $10^{-10}$ to $10^{-5}$ atmosphere to produce a melt. All of the iron in the melt is in the +2 oxidation state.

In the manner described previously for preparing $V_2O_3$, the heating of the pellets to produce a melt takes place in a furnace atmosphere provided by a gas mixture of $CO_2$ and $H_2$ in various desired mixing ratios, typically in the range of about 10/1 to 1/1. These selected ratios are kept constant for the duration of the synthesis by use of a differential manometer. By this method the oxygen pressure at the specified temperature can be controlled to better than ±1%. The thermodynamic data for the water-gas reaction ($CO_2 + H_2 = CO + H_2O$), on which the calculations were based, are known with extremely high accuracy (better than 0.1%), and hence the method used ensures reliable accurate control of the oxidation state of vanadium during the synthesis. This is extremely important for optimization of the properties of the finished product.

The molten material from the furnace is cooled to a temperature which is above the freezing point of the rest of the melt e.g., above about 1200° C. The cooling takes place over a period in the range of about 1 to 10 hours while at substantially the same partial pressure of oxygen as that in the furnace. The vanadium spinel material will thereby crystallize out from the melt and may be separated by conventional means from the rest of the melt, such as by decanting.

The vanadium spinel materials produced by the subject process may be used as an oxidation catalyst, offering improved activity and yields and greater stability over a wider temperature range e.g. about 1000° C. or higher than that which is offered by conventional oxidation catalysts. For example, as an oxidation catalyst the subject vanadium spinel materials may be used in the conversion of o-xylene to phthalic anhydride, butene to maleic anhydride, or alcohols to aldehydes or organic acids.

Various modifications of the invention as herein before set forth may be made without departing from the spirit and scope thereof, and therefore, only such limitations should be made as are indicated in the appended claims.

We claim:

1. A method of preparing a vanadium spinel material that is crystallized from a liquid with which said vanadium spinel is in equilibrium on the liquidus surface and wherein said liquid has a composition that falls within a polygon shaped shaded area ABCDE as shown in the disclosed FIGURE for a ternary composition diagram of $V_2O_3$, MnO and $SiO_2$ comprising the steps of:

(1) heating $V_2O_5$ powder having a particle size of less than about 50 microns in an atmosphere in which the partial pressure of oxygen is in the range of $10^{-5}$ to $10^{-10}$ atmospheres while gradually increasing the temperature over a temperature range of about 600° C. to 1300° C. and holding the final temperature for a period to ensure complete reduction of all vanadium to $V^{3+}$;

(2) heating MnO powder having a particle size of less than about 50 microns for a period of about 10 to 14 hrs. at a temperature in the range of about 1200° C. to 1400° C.;

(3) heating $SiO_2$ powder having a particle size of less than about 50 microns for a period of about 10 to 14 hours at a temperature in the range of about 1000° C. to 1200° C.;

(4) thoroughly grinding together an amount of $V_2O_3$ from (1) in the range of about 25 to about 98 wt.%, with an amount of MnO from (2) in the range of more than 0 to about 55 wt.%, and with an amount of $SiO_2$ from (3) in the range of about more than 0 to about 40 wt.% to produce a mixture having a grain size of less than about 50 microns, (5) pelletizing the mixture from (4) at a pressure of about 5,000 psi;

(6) heating the pellets from (5) at a temperature in the range of about 1200° C. to 1600° C. for a period in the range of about 12 to 48 hrs. in an atmosphere in which the partial pressure of oxygen is in the range of $10^{-10}$ to $10^{-5}$ atmosphere to produce a melt; and (7) cooling the material from (6) and crystallizing out said vanadium spinel material, and separating said vanadium spinel material from the rest of the melt.

2. The method of claim 1 wherein said polygon shaped shaded area has the following vertices and corresponding coordinates in weight percent:

| Vertices | Coordinates (wt %) | | |
|---|---|---|---|
| | $V_2O_3$ | MnO | $SiO_2$ |
| A | 44 | 55 | 1 |
| B | 25 | 55 | 20 |
| C | 25 | 35 | 40 |
| D | 59 | 1 | 40 |

| Vertices | Coordinates (wt %) | | |
|---|---|---|---|
| | $V_2O_3$ | MnO | $SiO_2$ |
| E | 98 | 1 | 1 |

3. The method of claim 1 where in (1) said $V_2O_5$ powder is heated over a period of about 12 to 24 hours from a temperature of about 600° C. to a final temperature of 1300° C.; and the final temperature of the vanadium oxide is held at least 24 hours.

4. The method of claim 1 where in (i) said $V_2)_5$ powder is heated in an atmosphere comprising a gas mixture of high purity $CO_2$ and $H_2$ with a volume ratio of $CO_2/H_2$ in the range of about 10/1 to 1/1.

5. The method of claim 1 where in steps (5) and (6) said pellets are respectively heated and cooled in an atmosphere comprising a gas mixture of high purity $CO_2$ and $H_2$ with a volume ratio of $CO_2/H_2$ in the range of about 10/1 to 1/1.

6. The method of claim 2 wherein said vanadium spinel material is crystallized from a liquid having the composition illustrated by point F in said composition diagram and having the following coordinates in wt.%: $V_2O_3$ 65, MnO 30 and $SiO_2$ 5.

7. A vanadium spinel material that is crystallized from a liquid with which said vanadium spinel is in equilibrium on the liquidus surface wherein said liquid has a composition that falls within the shaded area circumscribed by ABCDE as shown in the disclosed FIGURE for a ternary composition diagram of $V_2O_3$, MnO and $SiO_2$, and the amounts of $V_2O_3$, MnO and $SiO_2$ are characterized as shown in the table below:

| Vertices | Coordinates (wt %) | | |
|---|---|---|---|
| | $V_2O_3$ | MnO | $SiO_2$ |
| A | 44 | 55 | 1 |
| B | 25 | 55 | 20 |
| C | 25 | 35 | 40 |
| D | 59 | 1 | 40 |
| E | 98 | 1 | 1 |

8. A vanadium spinel material as provided in claim 7 and crystallized from a liquid having the composition illustrated by point F in said composition diagram and having the following coordinates in wt.%: $V_2O_3$ 65, MnO 30 and $SiO_2$ 5.

9. The vanadium spinel material as provided in claim 7 and having a crystalline size in the range of about 1 to 50 microns.

10. A vanadium spinel material as provided in claim 1 wherein said vanadium is present in the trivalent state.

11. An oxidation catalyst comprising a vanadium spinel material that is crystallized from a liquid with which said vanadium spinel is in equilibrium on the liquidus surface, and wherein said liquid has a composition that falls within a polygon shaped shaded area ABCDE as shown in the disclosed FIGURE for a ternary composition diagram of $V_2O_3$, MnO and $SiO_2$, and wherein the amounts of $V_2O_3$, MnO and $SiO_2$ are characterized as shown in the table below:

| Vertices | Coordinates (wt %) | | |
|---|---|---|---|
| | $V_2O_3$ | MnO | $SiO_2$ |
| A | 44 | 55 | 1 |
| B | 25 | 55 | 20 |
| C | 25 | 35 | 40 |
| D | 59 | 1 | 40 |
| E | 98 | 1 | 1 |

* * * * *